(12) United States Patent
McColgan et al.

(10) Patent No.: US 6,971,607 B2
(45) Date of Patent: Dec. 6, 2005

(54) AIRCRAFT AIR CONDITIONING SYSTEM MIXER WITH CORRUGATIONS

(75) Inventors: Charles J. McColgan, West Granby, CT (US); Donald R. Desmarais, Jr., Westfield, MA (US); Christopher G. Haddad, West Willington, CT (US); Thomas M. Zywiak, Suffield, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 17 days.

(21) Appl. No.: 10/705,582

(22) Filed: Nov. 10, 2003

(65) Prior Publication Data

US 2005/0061913 A1 Mar. 24, 2005

Related U.S. Application Data

(60) Provisional application No. 60/504,671, filed on Sep. 22, 2003.

(51) Int. Cl.[7] .............................................. B64D 13/08
(52) U.S. Cl. ..................................... 244/118.5; 454/76
(58) Field of Search ....................... 244/118.5; 165/44, 165/154; 454/71, 76, 77

(56) References Cited

U.S. PATENT DOCUMENTS

| | | | | |
|---|---|---|---|---|
| 1,543,449 A | * | 6/1925 | Rust | 165/154 |
| 2,133,349 A | * | 10/1938 | Gray | 165/51 |
| 2,443,262 A | * | 6/1948 | McCollum | 126/110 R |
| 3,036,818 A | * | 5/1962 | Legrand | 165/154 |
| 3,253,647 A | * | 5/1966 | Deshaies | 165/44 |
| 3,409,274 A | | 11/1968 | Lawton | |
| 3,749,336 A | | 7/1973 | Christensen et al. | |
| 3,929,285 A | | 12/1975 | Daugherty, Jr. | |
| 3,974,646 A | | 8/1976 | Markowski et al. | |
| 4,330,082 A | | 5/1982 | Wilson | |
| 4,437,513 A | * | 3/1984 | Castiglioni et al. | 165/154 |
| 4,625,916 A | | 12/1986 | Nieuwkamp et al. | |
| 5,127,878 A | | 7/1992 | Meckler | |
| 5,133,194 A | | 7/1992 | Army, Jr. et al. | |
| 5,145,124 A | | 9/1992 | Brunskill et al. | 244/118.5 |
| 5,516,330 A | | 5/1996 | Dechow et al. | |
| 5,634,964 A | | 6/1997 | Army, Jr. et al. | |
| 6,004,204 A | | 12/1999 | Luxton et al. | |

(Continued)

FOREIGN PATENT DOCUMENTS

EP  0 326 950 A  8/1989

(Continued)

OTHER PUBLICATIONS

PCT International Search Report, date Jan. 12, 2005.
Search Rpt. PCT/US2004/030941.

*Primary Examiner*—Robert P. Swiatek
(74) *Attorney, Agent, or Firm*—Carlson, Gaskey & Olds

(57) ABSTRACT

A mixer includes a fresh air tube defining a passage having an inlet receiving conditioned air from an air conditioning pack. The fresh air tube includes an outlet providing mixed air to a cabin of the aircraft. An outer tube at least partially surrounds the fresh air tube and receives recirculated air from the cabin. A circumferential corrugation in the fresh tube forms multiple lobes in the fresh air tube fluidly connect the outer tube to the fresh air tube. The warm recirculation air surrounds the portion of the fresh air tube to heat it preventing ice from forming. The warm recirculation air entering the fresh air tube through the lobes homogeneously mixes with the conditioned air from the pack to provide a uniform mixture of air within the fresh air tube, which further ensures the prevention of ice build up.

12 Claims, 1 Drawing Sheet

| U.S. PATENT DOCUMENTS | | | | FOREIGN PATENT DOCUMENTS | | |
|---|---|---|---|---|---|---|
| 6,308,914 B1 | 10/2001 | Spurway et al. | | FR | 2 599 437 | 12/1987 |
| 6,389,826 B2 | 5/2002 | Buchholz et al. | | GB | 671 567 A | 5/1952 |
| 6,619,589 B2 | 9/2003 | Brasseur et al. ......... 244/118.5 | | WO | WO 01/11292 | 2/2001 |
| 6,726,354 B1 | 4/2004 | Breuer et al. | | WO | WO 02/066324 A | 8/2002 |
| 6,767,007 B2 | 7/2004 | Luman | | | | |
| 2002/0092948 A1 | 7/2002 | Dugan | | * cited by examiner | | |
| 2003/0080244 A1 | 5/2003 | Dionne | | | | |

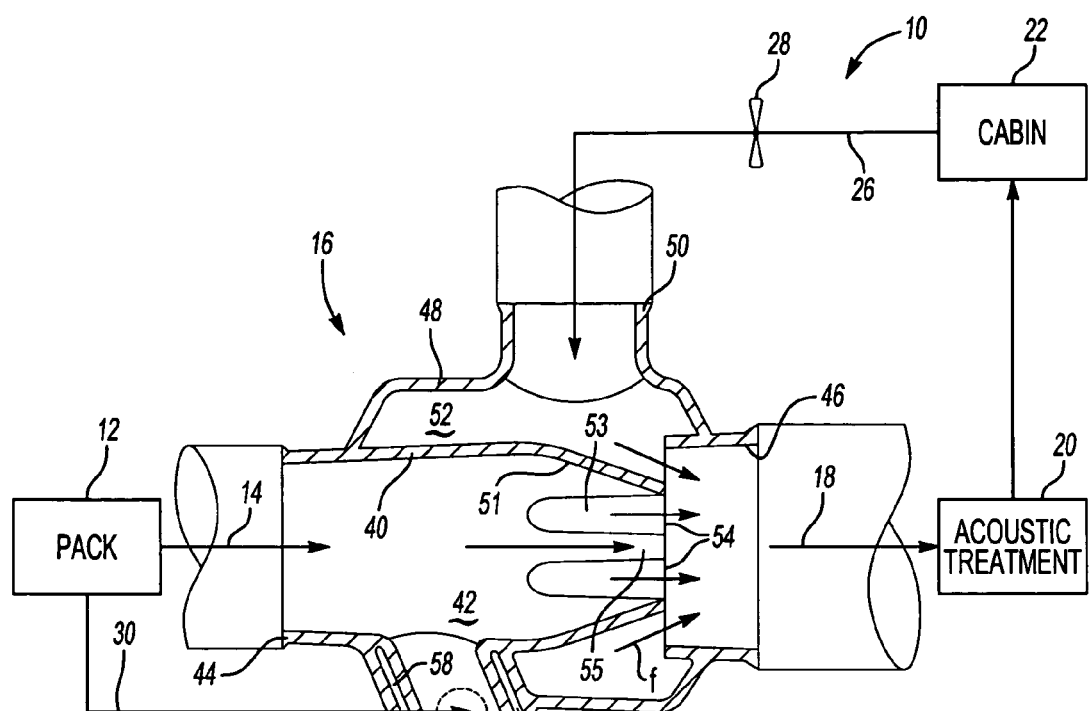
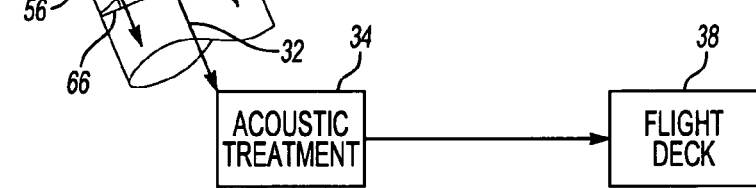
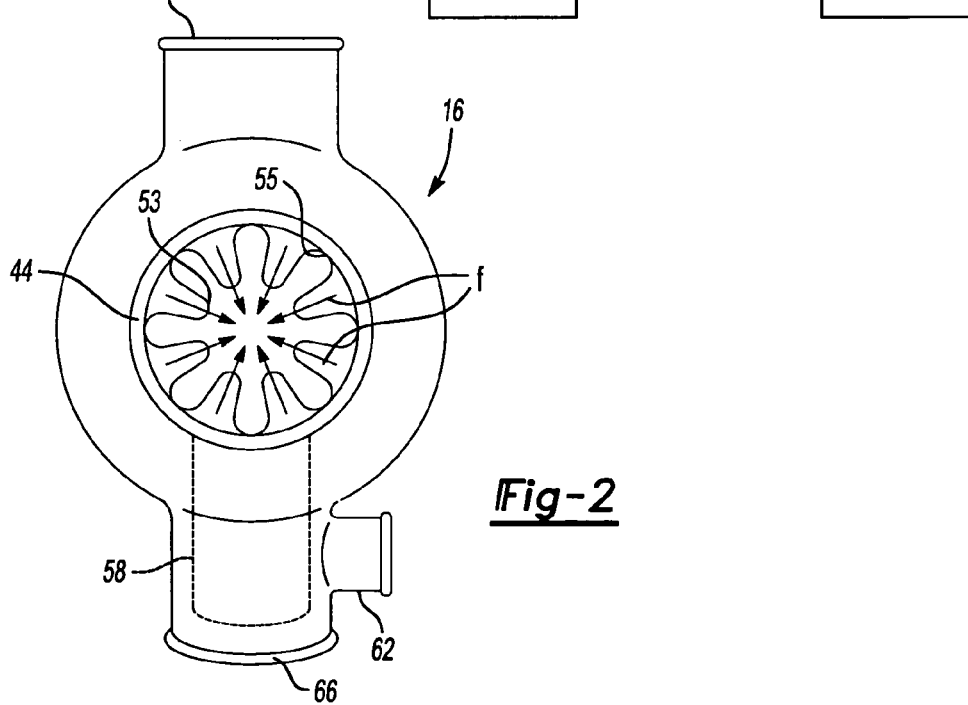

US 6,971,607 B2

AIRCRAFT AIR CONDITIONING SYSTEM MIXER WITH CORRUGATIONS

The application claims priority to U.S. Provisional Application No. 60/504,671, which was filed on Sep. 22, 2003.

BACKGROUND OF THE INVENTION

The present invention relates to an aircraft air conditioning system mixer, and more particularly, this invention relates to a mixer for mixing air from an air conditioning pack and other air.

Aircraft air conditioning systems provide conditioned air to the aircraft cabin and other locations throughout the aircraft. An aircraft air conditioning system pack takes fresh air from the exterior of the aircraft and conditions the air, for example by using an air cycle machine as is known in the art, for use throughout the aircraft.

The pack provides very cold air that must be mixed with recirculated air to provide to the aircraft cabin. For example, a mixer takes the conditioned air and mixes it with cabin circulation air, which is at a higher temperature than the conditioned air. The mixer is typically configured in a T-shape and occupies a large space. In the prior art, a large mixer is needed to achieve required mixing and to prevent the mixer from icing up, which results in a pressure drop in the mixer, decreased pack performance and ice particles being distributed into the cabin. As ice builds up and restricts the flow of conditioned air through the mixer, the air cycle machine (ACM) speed decreases reducing the ability of the pack to produce cold air. To address this problem, the prior art uses a mixer that is approximately the size of a 55 gallon drum. As the cold air from the pack mixes with humid recirculation air, the moisture in the recirculation air condenses and freezes causing ice to collect at the bottom of the mixer where it inhibits the flow of conditioned air through the mixer. Desirably, prior art mixers produce a uniform temperature of the mixed air at the outlet due to the large volume of the mixer.

Therefore, what is needed is a smaller mixer that is not subject to ice build up while producing a uniform mixed air outlet temperature.

SUMMARY OF THE INVENTION

The inventive air conditioning system mixer includes a fresh air tube defining a passage having an inlet receiving conditioned air from an air conditioning pack. The fresh air tube includes an outlet providing mixed air to a cabin of the aircraft. An outer tube at least partially surrounds the fresh air tube and receives recirculated air from the cabin. The outlet of the fresh air tube is fluidly connected to the outlet of the recirculation air outer tube.

The warm recirculation air surrounds the portion of the fresh air tube to heat it preventing ice from forming. The warm recirculation air entering the fresh air tube through the lobes homogeneously mixes with the conditioned air from the pack to provide a uniform mixture of air at the outlet of the mixer. The fresh air tube includes circumferential corrugations forming peaks and valleys. The corrugations define the lobes connecting the outer tube to the fresh air tube. The corrugations have a sloped wall extending in a direction from the inlet to the outlet of the fresh air tube. The sloped wall and circumferential corrugations provide a uniform temperature at the mixed outlet of the mixer.

In applications where air is provided to a flight deck separately from the cabin, the mixer includes a flight deck supply tube that is arranged about an inner tube that is fluidly connected to the fresh air tube upstream of the holes. Trim air is fed into the flight deck supply tube and flows around the inner tube to heat the inner tube preventing ice build up.

Accordingly, the present invention provides a smaller mixer that is not subject to ice build up while producing a uniform mixed air outlet temperature.

These and other features of the present invention can be best understood from the following specification and drawings, the following of which is a brief description.

BRIEF DESCRIPTION OF THE DRAWINGS

FIG. 1 is a schematic view of the inventive aircraft air conditioning system with the inventive mixer.

FIG. 2 is a front elevational view of the inventive mixer shown in FIG. 1.

DETAILED DESCRIPTION OF THE PREFERRED EMBODIMENT

An inventive aircraft conditioning system 10 is shown schematically in FIG. 1. The system 10 includes an air conditioning pack 12 that provides fresh conditioned air from an ACM. The pack 12 receives the fresh air from an engine bleed valve, or more preferably, an electrically driven supercharger.

Conditioned air 14 from the pack 12 flows into the inventive mixer 16. Mixed air 18 exits the mixer 16 and enters an acoustic treatment device 20 to reduce the noise. Once treated, the mixed air 18 is delivered to an aircraft cabin 22. Recirculation air 26 from the cabin 22 is returned to the mixer 16 by a fan 28 where it is mixed with the conditioned air 14 to obtain the mixed air 18 within a desired temperature range.

Some aircraft configurations require the delivery of air to an aircraft flight deck 38 that is separate from the air delivered to the cabin 22. For such applications, the mixer 16 receives trim air 30 from the pack 12 to mix with the conditioned air 14. The trim air 30 may be supplied from hot air upstream from the pack 12 and downstream from the engine or superchargers. The mixer 16 delivers conditioned air 32 to an acoustic treatment device 34 from which the conditioned air is delivered to the flight deck 38.

The inventive mixer 16 prevents ice from building up within the mixer which would reduce the efficiency of the pack while maintaining the uniform mixed air outlet temperature. The mixer 16 includes a fresh air tube 40 defining a passage 42 extending from an inlet 44 to an outlet 46. The inlet 44 receives conditioned air 14 from the pack 12. The outlet 46 delivers mixed air 18, which is a mixture of the conditioned air 14 and the recirculation air 26, to the acoustic treatment device 20.

An outer tube 48 at least partially surrounds the fresh air tube 40 to form a cavity 52. During operation of the system 10, recirculation air 26 flows through a recirculation air inlet 50 into the cavity 52, filling the cavity 52 with warm recirculation air 26. The warm recirculation air 26 conducts heat into the fresh air tube 40, which raises the temperature of the fresh air tube 40 preventing ice from forming.

The wall of the fresh air tube 40 has circumferential corrugations forming lobes having peaks 53 and valleys 55. The circumferential corrugations may be integrally formed with the rest of the mixer 16, or may be formed by inserting a separate structure within the passage 42. Multiple lobes 54 are arranged circumferentially about the exit of the fresh air tube 40 to fluidly connect the fresh air tube 40 with the cavity 52. The warm recirculation air 26 flows from the cavity 52 through the lobes 54 into the passage 42 where it homogeneously mixes with the conditioned air 14 producing mixed air 18 having a uniform temperature.

The fresh air tube 40 has a sloped wall 51 sloping inwardly from the inlet side of the mixer 16 toward the outlet side. The gently sloping wall 51 creates a flow path for the recirculation air 26 to mix with the conditioned air 14. The peaks 53 and valleys 55 provide an increased surface area to increase the heat transfer through the wall of the fresh air tube 40 from the warm recirculation air 26. The uniform temperature of the mixed air 18 prevents cold spots within the mixer 16 that could permit ice formation.

For applications having a separate air supply for the flight deck 38, the mixer 16 may include a flight deck supply tube 56 extending from the body of the mixer 16. An inner tube 58 extends at an angle from the fresh air tube 40 and is arranged within the flight deck supply tube 56. The angle is less than 90° to enhance flow from the passage 42 to the inner tube 58. The passage 42 is larger in diameter than the inner tube 58 as the cabin 22 requires considerably more air flow than the flight deck 38. The tubes 56 and 58 are spaced from one another to form a cavity 60. Preferably, the lobes 54 are arranged downstream from the inner tube 58 so that the recirculation air 26 does not mix with air to the flight deck 38.

Referring to FIGS. 1 and 2, a trim air tube 62 extends from a side of the flight deck supply tube 56 to deliver the trim air 30 to the cavity 60. The hot trim air 30 within the cavity 60 conducts heat into the wall of the inner tube 58 preventing ice from building up on this wall. The trim air and conditioned air meet and begin to mix at the end of the inner tube 58. As with the other inlets and outlets of the mixer 16, a duct 64 is connected to an outlet 66 of the flight deck supply tube 56 by clamps. The trim air and conditioned air may continue to mix within the duct 64.

The mixer 16 may be cast or molded from any suitable material. The inventive mixer is considerably smaller than prior art mixers, approximately nine inches in diameter and 2 ft.×2 ft.×2 ft. in volume, without compromising performance and reliability. Moreover, the inventive mixer is much lighter than prior art mixers.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An aircraft air conditioning system mixer comprising:
   a first tube having a passage extending between an inlet and an outlet; and
   a second tube at least partially surrounding said first tube forming a cavity, said first tube having a circumferential corrugation in said first tube forming at least one lobe fluidly connecting said first tube and said cavity, said corrugation sloping toward said outlet and providing an opening facing said outlet.

2. The mixer according to claim 1, wherein said inlet is a conditioned air inlet for receiving conditioned air from a pack.

3. The mixer according to claim 2, wherein said second tube includes a recirculation air inlet for receiving recirculation air from an aircraft cabin, and said outlet for delivering mixed air to the cabin.

4. The mixer according to claim 3, wherein the recirculation air is hotter than the conditioned air, the recirculation air heating the mixer and conditioned air preventing ice formation within said mixer.

5. The mixer according to claim 1, wherein multiple lobes are arranged about a circumference of said first tube with said lobes fluidly connecting said cavity and said passage.

6. An aircraft air conditioning system mixer comprising:
   a first tube having a passage extending between an inlet and an outlet, wherein said inlet is a conditioned air inlet for receiving conditioned air from a pack;
   a second tube at least partially surrounding said first tube forming a cavity, said first tube having a circumferential corrugation in said first tube forming at least one lobe fluidly connecting said first tube and said cavity; and
   a flight deck supply tube extending from said mixer and an inner tube extending from said first tube and fluidly connected therewith, said inner tube arranged at least partially within said flight deck supply tube, forming another cavity between said inner tube and said flight deck supply tube, said another cavity for receiving trim air from a pack.

7. The mixer according to claim 6, wherein said inner tube is arranged between said lobes and said inlet.

8. An aircraft air conditioning system mixer comprising:
   a first tube having a passage extending between an inlet and an outlet; and
   a second tube at least partially surrounding said first tube forming a cavity, said first tube having a circumferential corrugation in said first tube forming at least one lobe fluidly connecting said first tube and said cavity, wherein multiple lobes are arranged about a circumference of said first tube with said lobes fluidly connecting said cavity and said passage, and wherein said lobes comprise peaks and valleys defined by a sloped wall sloping from an inlet side toward an outlet side.

9. An aircraft air conditioning system comprising:
   a pack producing conditioned air;
   a cabin providing recirculation air;
   a mixer fluidly connected between said pack and said cabin, said mixer including a fresh air tube having a passage extending between an inlet fluidly connected to said pack and an outlet fluidly connected to said cabin;
   an outer tube at least partially arranged about at least a portion of said fresh air tube forming a cavity, said outer tube having a recirculation air inlet connected to said cabin; and
   a circumferential corrugation in said fresh air tube forming at least one lobe fluidly connecting said cavity and said passage.

10. The system according to claim 9, wherein an inner tube extends from said fresh air tube and is fluidly connected therewith, a flight deck supply tube extending from said mixer and at least partially surrounding said inner tube forming another cavity between said inner tube and said flight deck supply tube, a trim air tube extending from said flight deck supply tube delivering trim air from said pack to said another cavity.

11. The system according to claim 9, wherein a plurality of said lobes are arranged in a wall of said fresh air tube.

12. The system according to claim 11, wherein said plurality of said lobes comprise peaks and valleys defined by a sloped wall sloping from an inlet side toward an outlet side.

* * * * *

UNITED STATES PATENT AND TRADEMARK OFFICE
CERTIFICATE OF CORRECTION

PATENT NO. : 6,971,607 B2
DATED : December 6, 2005
INVENTOR(S) : McColgan et al.

It is certified that error appears in the above-identified patent and that said Letters Patent is hereby corrected as shown below:

Column 3,
Line 60, insert -- and an exit tube fluidly connected to said passage between said inlet and said outlet. -- after "outlet" and before ".".

Column 4,
Line 35, insert -- and an exit tube fluidly connected to said passage between said inlet and said outlet -- after "passage" and before ", and".

Signed and Sealed this

Eleventh Day of April, 2006

JON W. DUDAS
*Director of the United States Patent and Trademark Office*